United States Patent [19]

Zwarg et al.

[11] 3,928,779

[45] Dec. 23, 1975

[54] EXCITATION WINDING ARRANGEMENT FOR A SALIENT POLE ELECTRIC MACHINE

[75] Inventors: Gunter Zwarg; Paul Kirchner, both of Berlin, Germany

[73] Assignee: Siemens Aktiengesellschaft, Munich, Germany

[22] Filed: Feb. 14, 1974

[21] Appl. No.: 442,685

[30] Foreign Application Priority Data

Feb. 19, 1973  Germany............................ 2308541

[52] U.S. Cl. .................................. 310/194; 310/45
[51] Int. Cl.² ........................................ H02K 3/00
[58] Field of Search ........... 310/192, 179, 194, 180, 310/185, 184, 208, 189, 216, 210, 218, 217, 310/262, 214, 43, 45, 254, 258, 259; 336/185, 208

[56] References Cited
UNITED STATES PATENTS

| | | | |
|---|---|---|---|
| 1,010,126 | 11/1911 | Dick ................................... | 310/194 |
| 2,347,063 | 4/1944 | Pollard............................... | 310/194 |
| 2,913,606 | 11/1959 | Guardiola .......................... | 310/194 |
| 3,106,654 | 10/1963 | Wesolowski ....................... | 310/269 |
| 3,333,131 | 7/1967 | Bush .................................. | 310/194 |
| 3,449,607 | 6/1969 | Sargent.............................. | 310/194 |
| 3,463,952 | 8/1969 | Norris ................................ | 310/269 |
| 3,543,067 | 11/1970 | Tharp ................................ | 310/194 |
| 3,549,926 | 12/1970 | Pentland............................ | 310/194 |
| 3,777,190 | 12/1973 | Guimbal ............................ | 310/192 |

*Primary Examiner*—R. Skudy
*Attorney, Agent, or Firm*—Kenyon & Kenyon Reilly Carr & Chapin

[57] ABSTRACT

The excitation winding arrangement for an electric machine with salient poles includes flat, disc-shaped coils wound of flat conductors in a single layer with insulated turns. The flat conductors are impregnated with a hardenable compound and are hardened so that the coils form self-supporting structural components which are placed over the insulated pole shank without additional mounting devices and are held with spacing relative to each other as well as to the yoke and pole shoe.

1 Claim, 5 Drawing Figures

U.S. Patent    Dec. 23, 1975    3,928,779
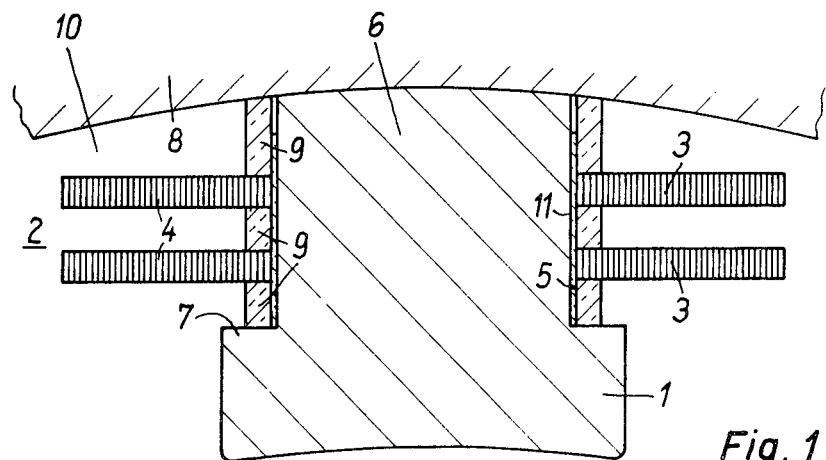
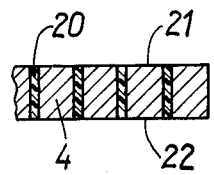
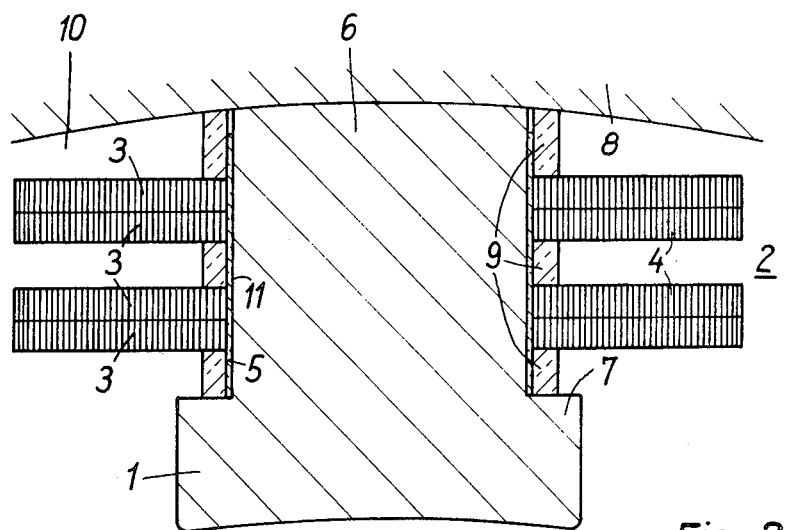
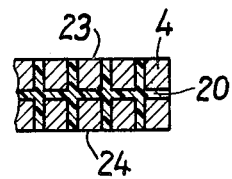

EXCITATION WINDING ARRANGEMENT FOR A SALIENT POLE ELECTRIC MACHINE

BACKGROUND OF THE INVENTION

The invention relates to an excitation winding arrangement for electrical machines equipped with salient poles.

The excitation winding of electric machines with salient poles can be constructed from disc-shaped, edgewise-wound flat conductors. The turns of the flat conductors are insulated against each other, and the entire excitation coil is, in addition, covered with an insulation required for the potential difference occurring with respect to the iron parts of the pole and the yoke. The problem arises here to remove the heat produced in the excitation winding in the best possible manner so that much capacity can be accommodated in a small space. For this purpose, German Gebrauchsmuster No. 1,817,547 discloses that coils of the excitation winding are impregnated with a hardenable compound and are then hardened to avoid the formation of any voids that might impede the heat transfer; and in addition, metallic cooling plates are arranged between the edgewise-wound flat conductors. These cooling plates protrude from the coil insulation and the stream of cooling air in the pole gap flows thereover.

SUMMARY OF THE INVENTION

It is an object of the invention to provide an excitation winding arrangement which achieves a good heat transfer from the excitation winding while at the same time requiring less space.

The excitation winding arrangement of the invention is suitable for an electrical machine such as a direct-current machine or the like equipped with a yoke having a plurality of poles extending therefrom, each of the poles including a pole shoe and a corresponding pole shank. The excitation winding arrangement includes as a feature a plurality of disc-like coils. Each of the coils is wound of a flat conductor wound on its flat side in a single layer to form a disc-like member. Insulating compound means impregnates the coil and is hardened to impart to the member an inner strength sufficient to make the same a self-supporting component wherein the turns of the coil are insulated with respect to each other. Insulation is provided at each of the pole shanks and the coils are force-fit mounted on corresponding ones of the pole shanks so as to be in spaced relation with respect to each other, to the pole shoe and to the yoke.

According to an alternate embodiment of the invention, a plurality of disc-like coils can be provided which are apportioned into a plurality of groups of coils corresponding to respective ones of the poles. The coils of each of the groups is force-fit mounted on the pole shank corresponding to the group so as to be spaced from each other as well as from the yoke and the pole shoe.

The excitation winding consists of individual, single-layer, disc-shaped coils with insulated turns, which, held at a spacing relative to each other and to the yoke and the pole shoe, are placed over the insulated pole shank without additional mounting devices.

The individual coils of the excitation winding are thus flat discs, which, because of the impregnation and subsequent hardening of the turn insulation, have acquired so great an internal strength that they are used as self-supporting structural components. For mounting them on the pole, the disc-shaped coils are pushed over the insulated pole shank without special mounting devices. Because the disc-shaped coils are only insulated as to their turns, they are kept at a distance from each other and from the yoke and the pole shoe. Outer insulation of the coil is eliminated and thereby, also an additional thermal resistance. The heat can therefore be given off, also unimpeded by mounting devices, from the large, heat-emitting surface of the flat discs to the ambient air or to the stream of cooling air, which flows through the pole gaps. This efficient cooling of the coils makes it possible to highly stress the flat conductors thermally and permits high copper heat losses in the coil without the coils exceeding impermissible heating limits. The copper requirements and therefore, the space required for a given capacity is thus smaller than for an excitation coil of the known type. Furthermore, because of the flat shape of the coils, their greatest overhang is always in a plane perpendicular to the walls of the pole shank. Thereby, and through the already mentioned good thermal utilization, the pole height need to be only minimal whereby the outside diameter of the machine is reduced as compared to machines with exciter poles of the known kind. This means additional substantial cost savings.

A further advantage of the excitation winding arrangement of the invention is achieved by providing that each winding be composed of several individual coils. These coils can be connected in series or in parallel as desired, which makes it possible to adapt them easily to the required data of the excitation system. Therefore different excitation power can be obtained with identically constructed, but differently connected coils. Thus, the number of excitation coils with different dimensions for different machine configurations is reduced.

To impede the heat removal from the surfaces of the coils as little as possible, it is advantageous to arrange the spacer means directly next to the pole shank. These means do not perform a support function for the field coils. For rectangular coils, for instance, one can thus provide the spacer means only in the better ventilated pole gaps and not at the end-faces of the poles.

A further improvement of the heat transfer can also be achieved by arranging the insulation of the turns only between the individual flat conductors, so that the end-faces of the disc-shaped coils remain exposed, that is, so that they are metallically bare or are only covered by a thin layer of the hardened impregnant.

Although the invention is illustrated and described herein as excitation winding arrangement for a salient pole electric machine, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

FIG. 1 shows a broken-away portion, in radial section, of an electrical direct-current machine equipped with an excitation winding arrangement according to the invention.

FIG. 1A is a fragmentary view of a disc-like coil showing the disposition of the insulating material with respect to the coils turns.

FIG. 1B is a fragmentary view of a disc-like coil showing the disposition of the insulating material confined to the region between mutually adjacent turns in accordance with a subsidiary embodiment of the invention.

FIG. 2 is a schematic diagram showing an alternate embodiment of the arrangement in FIG. 1 wherein the disc-like coils are arranged in pairs.

FIG. 2A shows the disposition of the insulating material with respect to the conductors according to an embodiment subsidiary to the embodiment shown in FIG. 2.

DESCRIPTION OF THE PREFERRED EMBODIMENTS OF THE INVENTION

Referring to FIG. 1, in an electric direct-current machine, the excitation winding 2 is arranged on every main pole 1 and consists of two flat, disc-shaped coils 3 corresponding to each pole, the coils being electrically connected to each other. Each flat, disc-shaped coil 3 is built up of flat conductors 4 which, for insulating the turns, are covered with an appropriate impregnable insulating material. The flat conductor 4 is wound on its flat side. Each coil 3 is impregnated with a hardenable impregnating resin such as a mixture of epoxy resin-acid anhydride hardener for example. A firm cement bond of the wound flat conductors with each other is thereby produced, so that each coil 3 forms a self-supporting structural element.

The flat, disc-shaped coils 3 are pushed over the pole shanks 6 of the main poles 1 without any mounting devices and are kept at a distance from each other as well as being spaced from the yoke and the pole shoe. The pole shank is covered with insulation 5. The spacing is obtained by spacer means in the form of respective spacer strips 9 which are disposed directly next to the pole shank 6. These spacer strips 9 are arranged only in the pole gap 10 and not at the end-faces of the main poles 1. The coils 3 are, like the main poles 1 and their pole shank 6, of rectangular cross-section.

Because the excitation coils 3 lie essentially in a plane extending perpendicular to the side walls 11 of the pole shank 6, the height of the main poles 1 can always be kept very low. This results in a reduction of the outside diameter of the machine and therefore, in substantial cost savings. Moreover, the space required for the coils 3 of the excitation winding 2 configured in accordance with the invention is less than the space required for coils of the known kind because the flat, disc-shaped excitation coils 3 have a large, heat-emitting surface over which a stream of cooling air in the pole gaps 10 flows on all sides. In this way, the thermal stress of the flat conductors 4 of the coils 3 can be made very high, so that the copper required for a given amount of excitation power, and therefore again the space required for the coils 3 of the excitation winding 2, is less than for excitation coils of the conventional kind.

FIG. 1A shows the insulating material 20 surrounding the individual turns of conductor means 4.

According to a subsidiary embodiment, by confining the insulation 20 to the regions between mutually adjacent coil turns as shown in FIG. 1B, the end-faces 21 and 22 of the disc-like coil 3 can be left free thereby facilitating the transfer of heat from the coil.

FIG. 2 shows a different arrangement of the coils 3 of the excitation winding 2; this arrangement is advantageous for the case that the excitation winding 2 must have a large number of turns. In this embodiment the respective coils 3 are arranged in pairs and are kept at a distance from each other and from the pole piece 7 and the yoke 8 by spacer strips 9. In spite of this arrangement of the excitation coils 3 in pairs, a sufficiently large heat-emitting surface of the coils 3 is still available over which the stream of cooling air in the pole gap 10 flows directly.

Referring now to FIG. 2A, if, for the purpose of further improving the heat transfer, the coils 3 are provided with insulation 20 which is arranged only between the individual turns of the flat conductors 4 and leaves the end-faces 23 and 24 of the coils 3 exposed, then insulation must be provided between the mutually abutting end-faces of the pairwise arranged coils 3 in each instance as shown; however, this insulation can be relatively thin because it corresponds to only one turn insulation.

Also in this embodiment of the excitation winding 2 made up of single-layer wound coils of flat conductors 4, arranged in pairs, the space required in the radial direction is relatively small, so that the height of the main poles can be kept low.

The excitation winding arrangement of the invention incorporates a configuration of the coils of the excitation winding which achieves a good heat transfer while at the same time requiring less space.

What is claimed is:

1. In an electrical machine having a plurality of salient poles, each of the poles including an insulated pole shank, an excitation winding arrangement comprising; a plurality of individual disc-like coils, each of said coils being wound of a flat conductor, the conductor being wound on its flat side in a single layer in the form of a disc-like member having a plurality of mutually insulated turns one next to the other; insulating compound means impregnating said coil and hardened to impart to said member an inner strength sufficient to make the same a self-supporting component; said coils being apportioned into a plurality of groups of coils corresponding to respective ones of the poles, the coils of each of said groups being mounted on the insulated pole shank corresponding thereto so as to be tightly fitted thereon in spaced relation from each other, each of said coils being disposed with respect to the pole shank so as to extend outwardly in free space substantially in a plane perpendicular to the shank wall so as to cause the flat sides of the conductor to extend parallel to the shank wall, each of said coils having top and bottom surfaces likewise extending perpendicular to the shank wall; and, spacer means lying directly next to corresponding ones of the pole shanks for spacing said coils in free space and from each other, said spacer means being in contact with said coils only close in at the wall of the pole shank whereby said spacer means covers only a small fraction of said coil surfaces, said coils of each group being arranged into a plurality of coil pairs, each of said pairs being spaced from each other as well as from the yoke and the pole shoe, the coils of each pair having respective end-face surfaces juxtaposed, said insulating compound being confined to the spaces between each two mutually adjacent turns of the coils of each pair and between said juxtaposed surfaces whereby each of the coils of each coil pair has an uncovered outwardly facing end-face perpendicular to said pole shank.

* * * * *